United States Patent [19]
Anderson

[11] Patent Number: 5,805,919
[45] Date of Patent: Sep. 8, 1998

[54] METHOD AND SYSTEM FOR INTERLEAVING THE DISTRIBUTION OF DATA SEGMENTS FROM DIFFERENT LOGICAL VOLUMES ON A SINGLE PHYSICAL DRIVE

[75] Inventor: Michael H. Anderson, Westlake Village, Calif.

[73] Assignee: Micropolis Corporation, Chatsworth, Calif.

[21] Appl. No.: 538,981

[22] Filed: Oct. 5, 1995

[51] Int. Cl.⁶ .................................................. G06F 12/00
[52] U.S. Cl. ........................ 395/821; 395/439; 395/700; 395/500; 360/105; 364/900
[58] Field of Search ..................... 395/281, 439, 395/700, 182, 500, 651; 364/900; 360/61, 98.08, 45, 105, 97, 75

[56] References Cited

U.S. PATENT DOCUMENTS

| | | |
|---|---|---|
| 4,232,365 | 11/1980 | Englund . |
| 4,270,154 | 5/1981 | Crawford . |
| 4,577,240 | 3/1986 | Hedberg et al. . |
| 4,811,280 | 3/1989 | Berkowitz et al. . |
| 4,953,122 | 8/1990 | Williams .................................. 364/900 |
| 5,075,805 | 12/1991 | Peddle et al. ............................. 360/61 |
| 5,111,345 | 5/1992 | Muller . |
| 5,134,532 | 7/1992 | Svendsen et al. . |
| 5,202,799 | 4/1993 | Hetzler et al. . |
| 5,223,993 | 6/1993 | Squires et al. . |
| 5,237,689 | 8/1993 | Behnke .................................... 395/700 |
| 5,386,402 | 1/1995 | Iwata ......................................... 369/32 |
| 5,457,791 | 10/1995 | Matsumoto et al. ............... 395/182.03 |
| 5,465,343 | 11/1995 | Henson et al. .......................... 395/439 |
| 5,485,321 | 1/1996 | Leonhardt et al. ....................... 360/48 |
| 5,487,160 | 1/1996 | Bemis ..................................... 395/441 |

*Primary Examiner*—Ayaz R. Sheikh
*Assistant Examiner*—Eric Thiang
*Attorney, Agent, or Firm*—Coudert Brothers

[57] ABSTRACT

A physical drive divided into at least two logical volumes, each volume containing a plurality of data storage segments, at least some of the data storage segments in one volume being physically interleaved with at least some of the data storage segments in the other volume. The purpose of this configuration is to increase the average rate of data transfer between a computer and multiple logical volumes residing on a single physical drive.

7 Claims, 5 Drawing Sheets

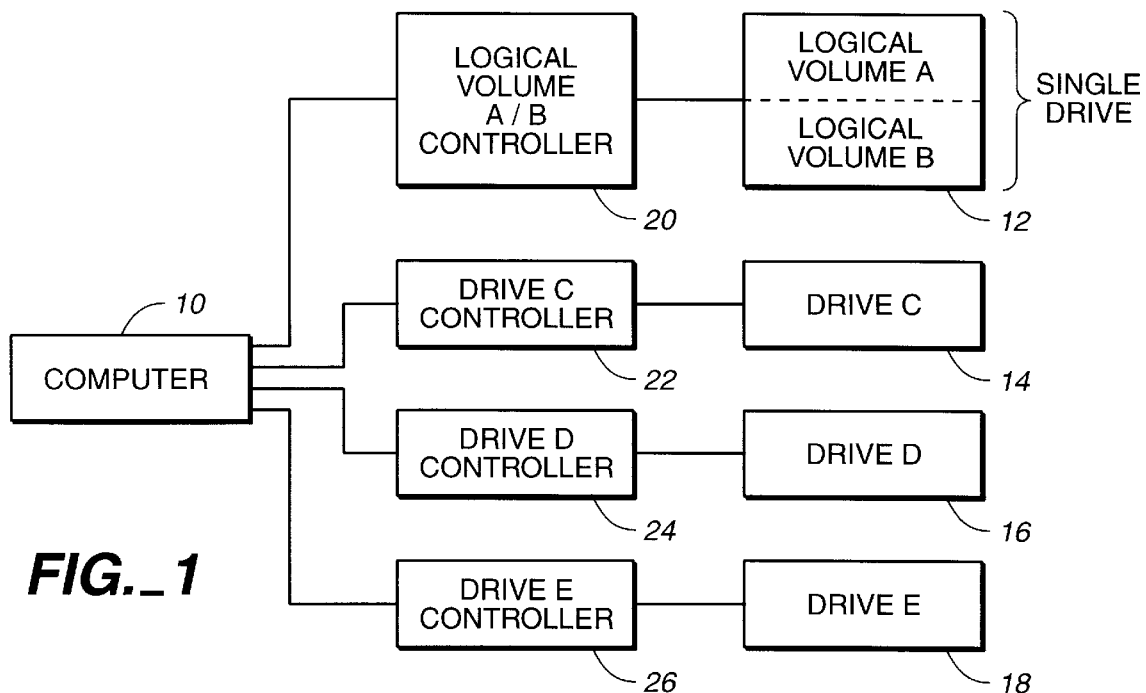
FIG._1
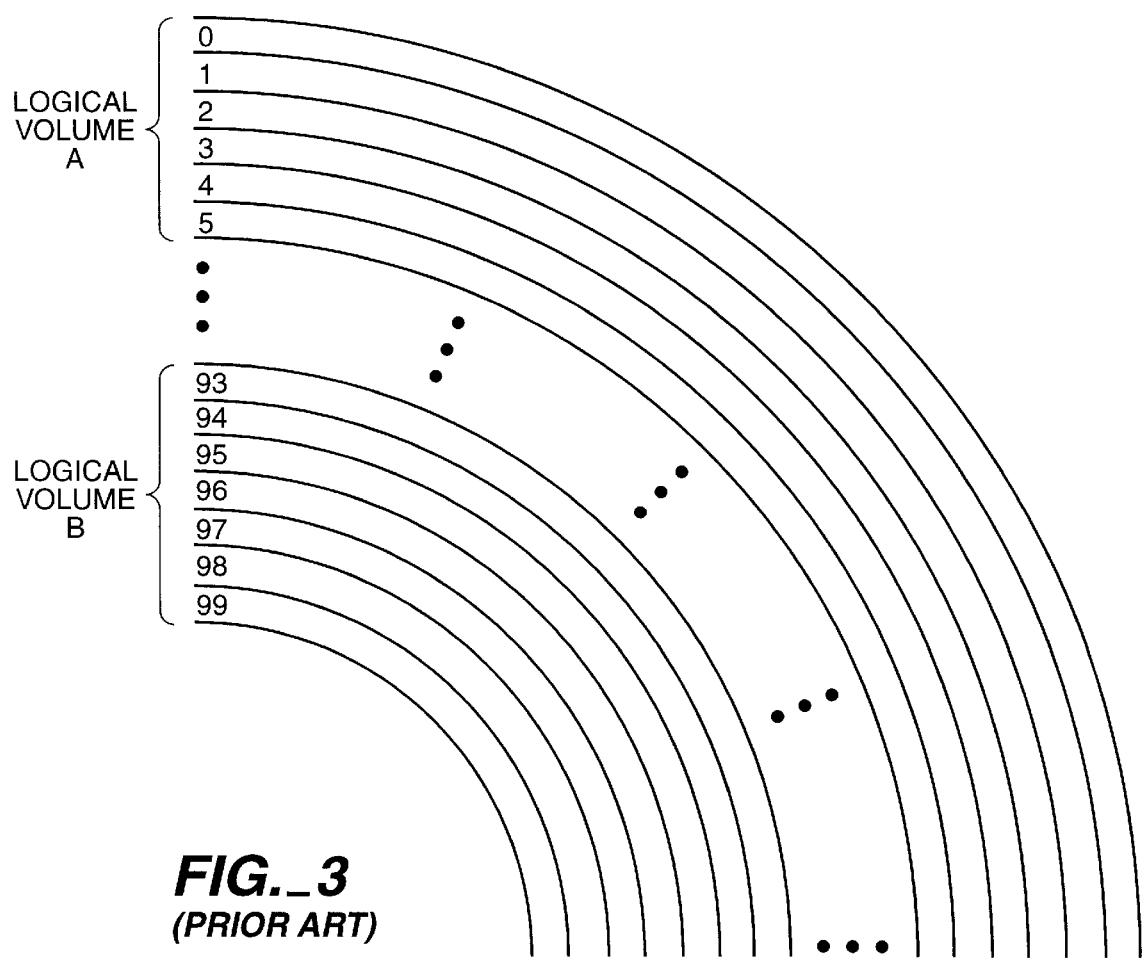
FIG._3
(PRIOR ART)

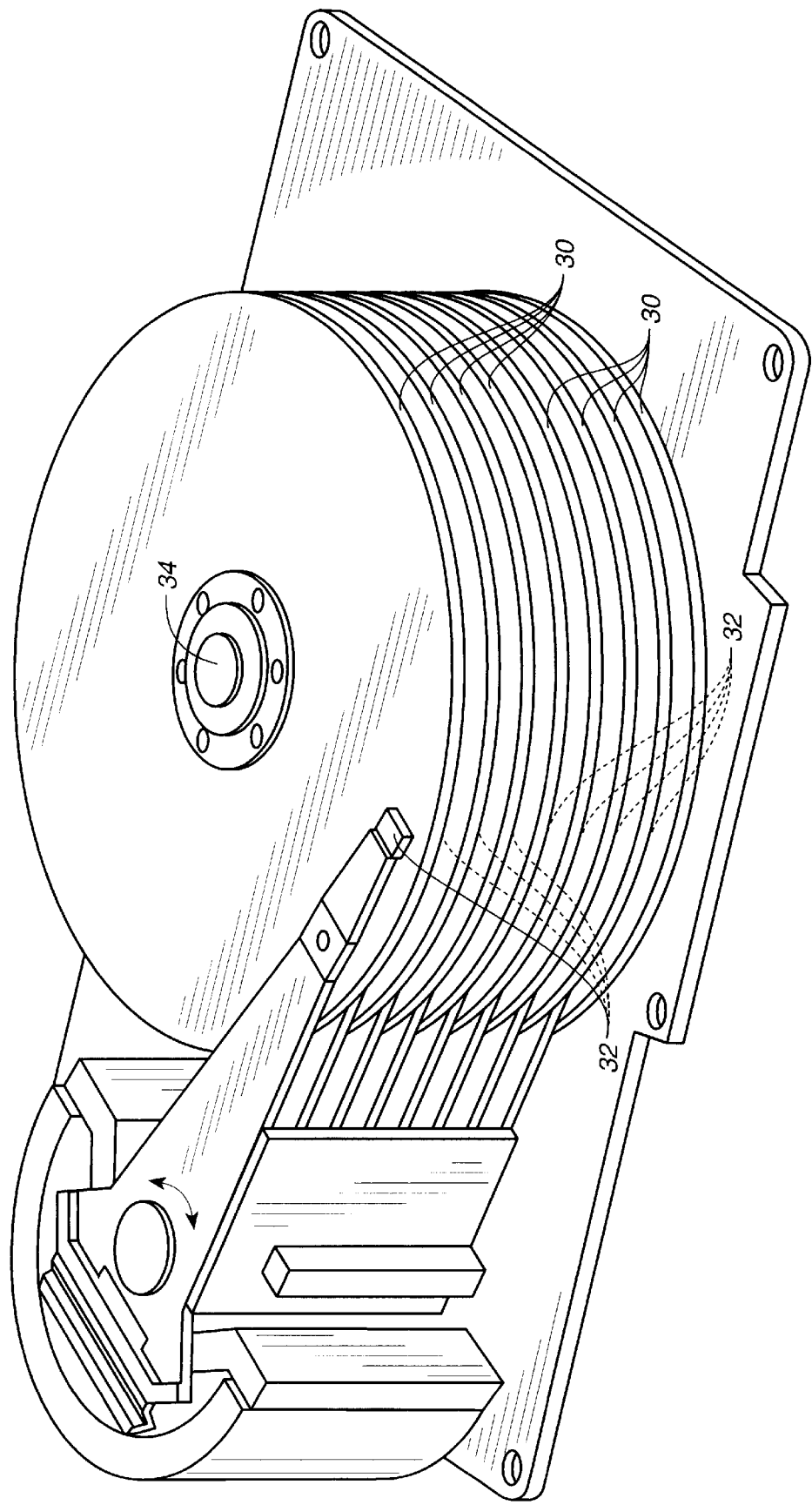
FIG._2

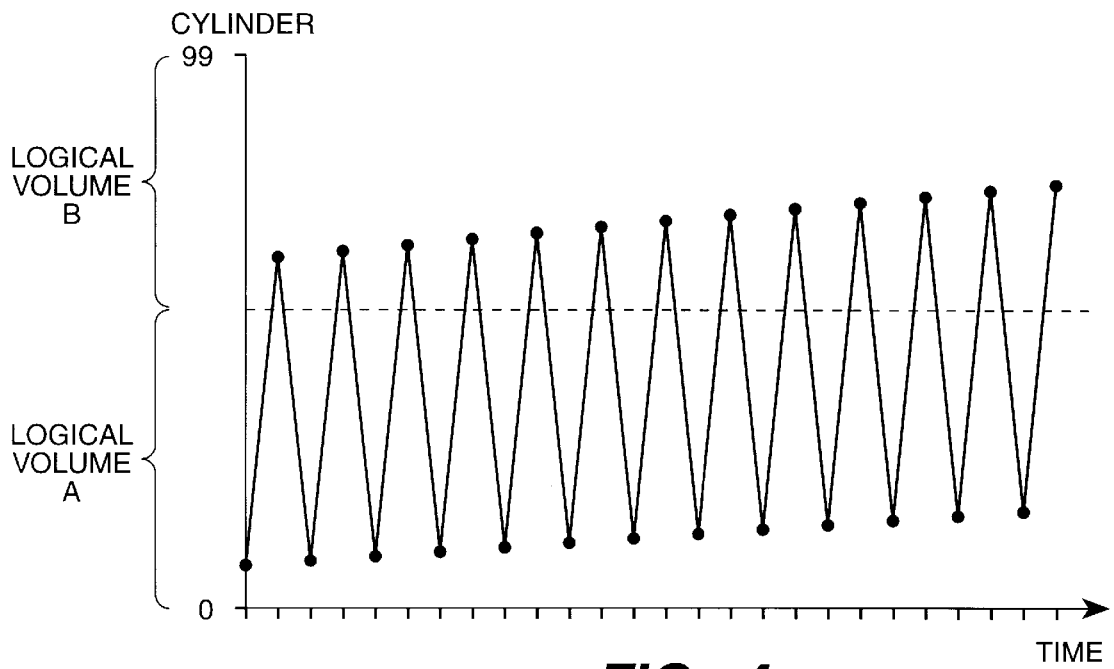
FIG._4 *(PRIOR ART)*
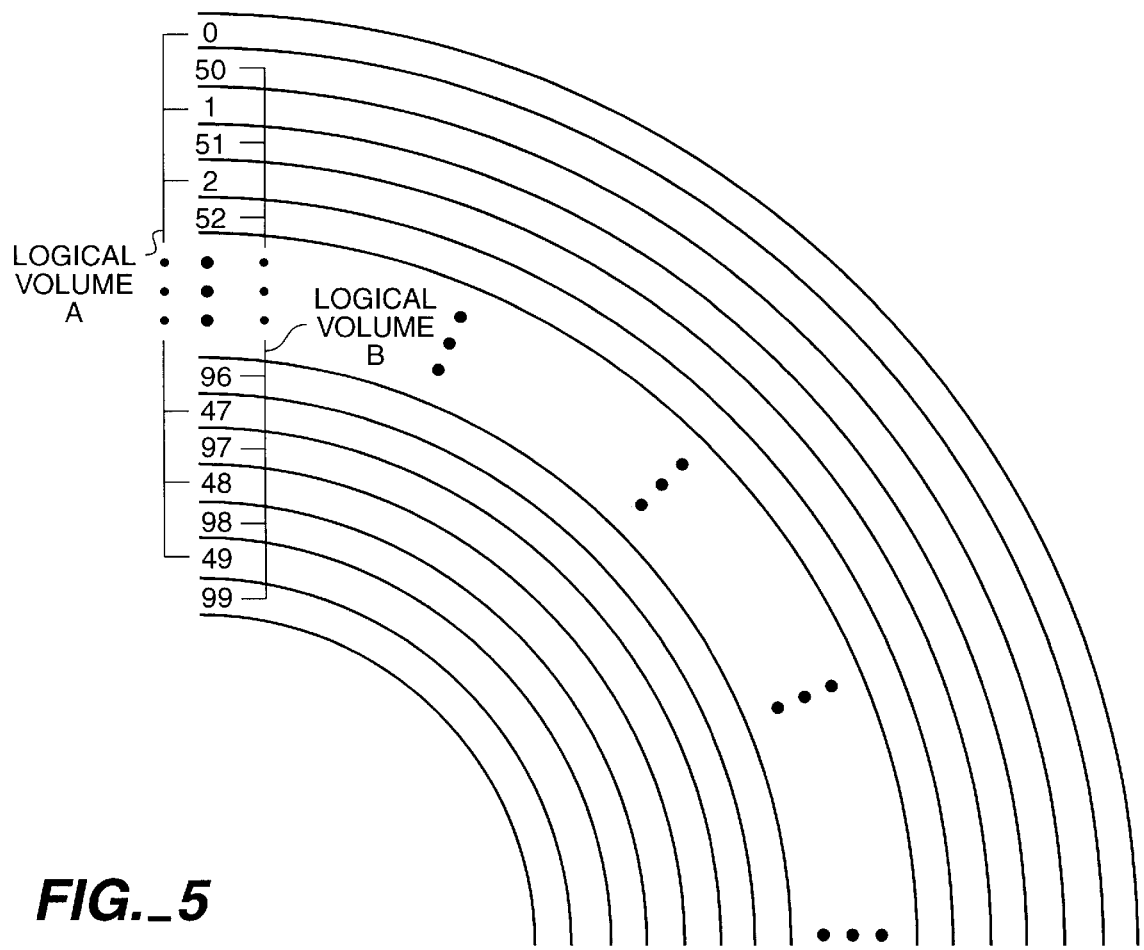
FIG._5

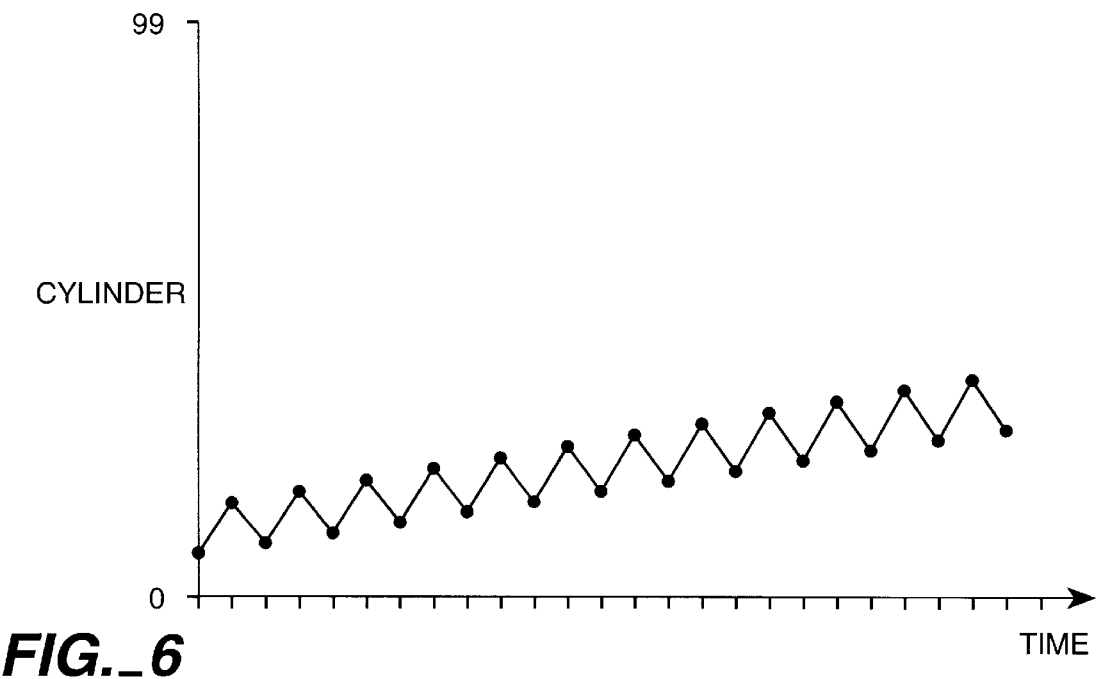
FIG._6
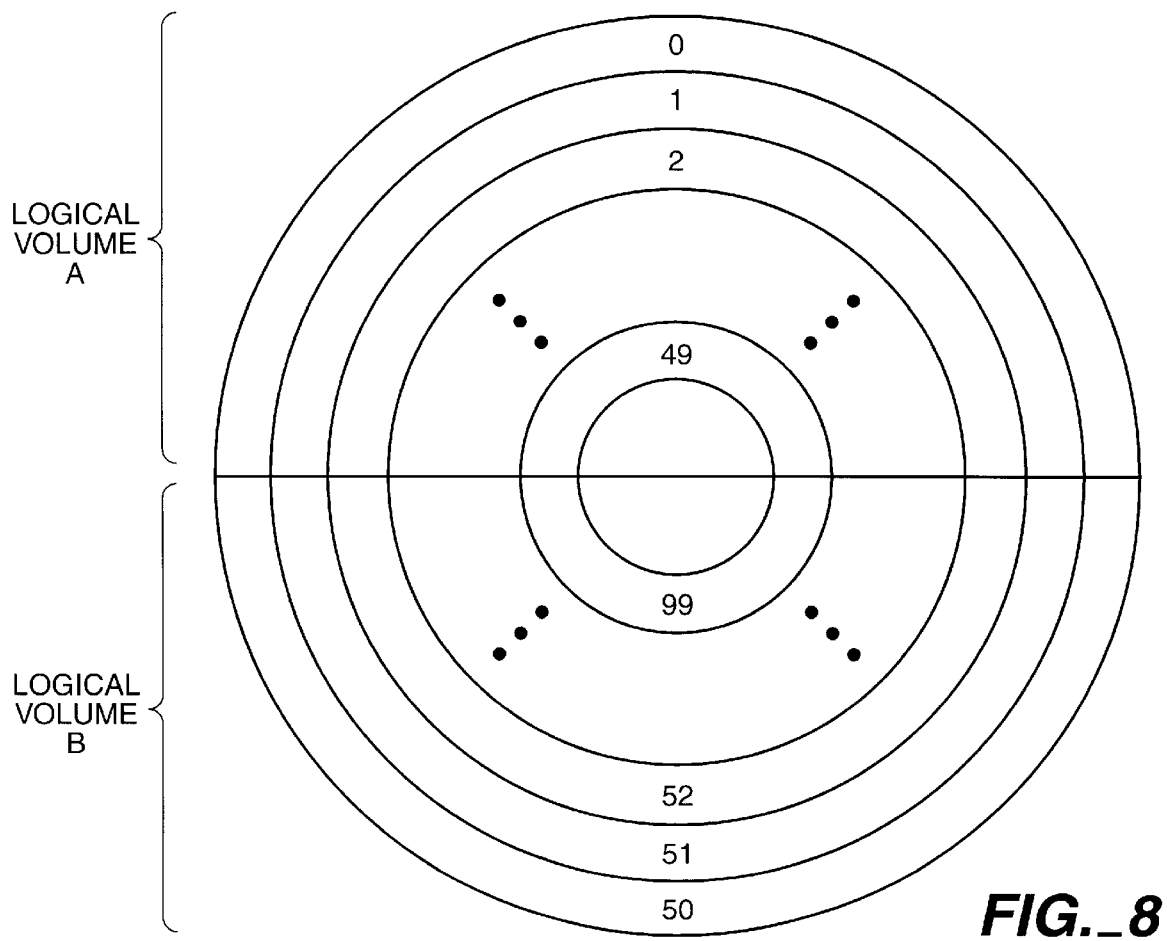
FIG._8

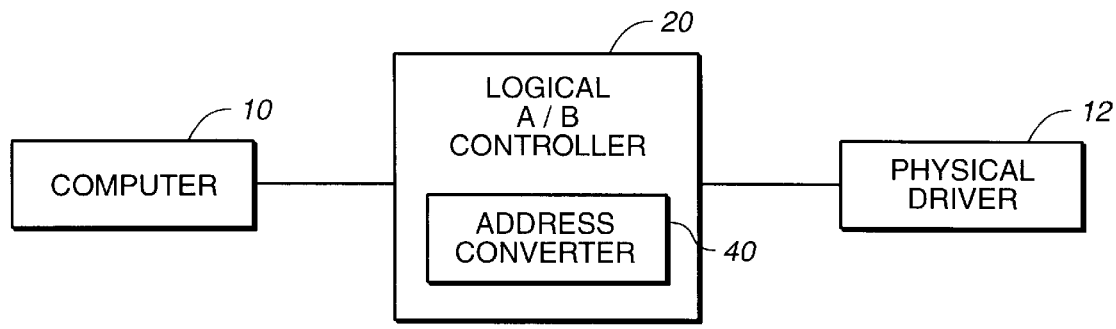
FIG._7
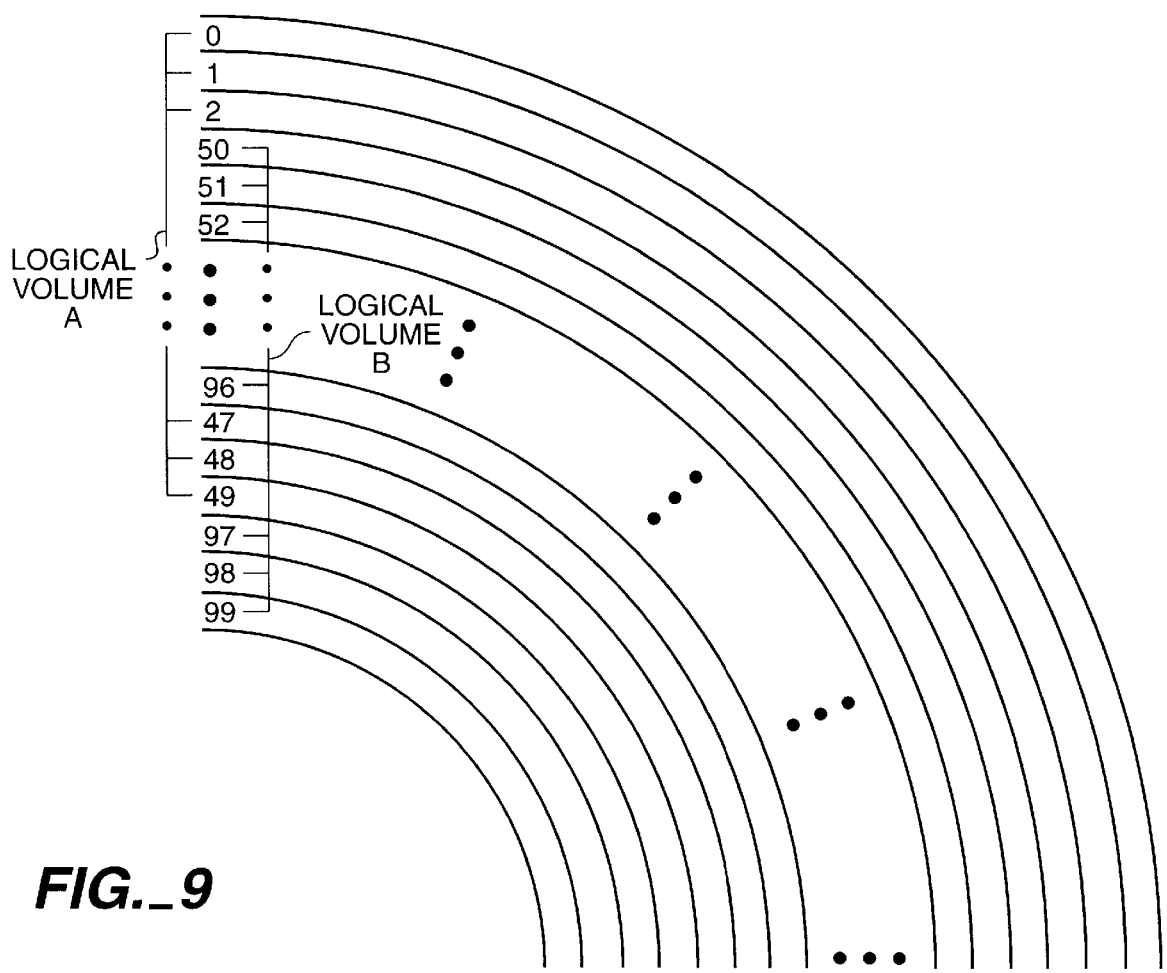
FIG._9

METHOD AND SYSTEM FOR INTERLEAVING THE DISTRIBUTION OF DATA SEGMENTS FROM DIFFERENT LOGICAL VOLUMES ON A SINGLE PHYSICAL DRIVE

BACKGROUND OF THE INVENTION

1. Field of the Invention

The present invention relates to data storage systems. More particularly, it relates to data storage systems which emulate multiple logical volumes on a single physical drive.

2. Description of Related Art

It is often useful to emulate two or more logical drives on a single physical drive. This is traditionally done by dividing the single physical drive into a plurality of "logical volumes," each volume being made to appear to the computer as a separate physical drive.

Each logical volume on a single physical drive is typically assigned to a physical zone on the single physical drive. Each zone is typically divided into a plurality of data storage segments, such as cylinders.

A controller is normally used as an interface between the physical drive and the computer. When a single physical drive is divided into a plurality of logical volumes, the controller normally maps data requests for each logical volume to the appropriate data segment on the single physical drive.

The requests to read or write data which are issued from the computer typically alternate between logical volumes on a frequent basis. This occurs because the software in the computer expects each logical volume to be on a separate physical drive. By alternating seeks between logical volumes, the software expects to obtain an increase in performance. Data can be read from or written to one drive, while the heads on another drive are seeking a new position.

When logical volumes are combined onto a single physical drive, however, a substantial degradation in performance often results. This occurs because the alternating requests from the software cause the single physical drive to "ping pong" back and forth between logical volumes.

SUMMARY OF THE INVENTION

One object of the present invention is to obviate these as well as other problems in emulating multiple logical volumes on a single physical drive.

Another object of the present invention is to increase the overall performance of a single physical drive when emulating multiple logical volumes.

These, as well as still further objects, features and benefits of the present invention are achieved by interleaving at least some of the data storage segments which comprise one logical volume with at least some of the data storage segments which comprise the other logical volume. Using this technique, the distances between the data storage segments which are typically accessed on a physical drive containing a plurality of logical volumes are substantially reduced. In turn, this substantially reduces degradation in performance.

In order to seamlessly integrate the interleaved data storage segments of the present invention with existing computers, the controller of the single physical drive maps access requests for data to the actual location of that data on the physical drive.

The invention contemplates a broad variety of interleaving topologies. For example, cylinders from each logical volume can be interleaved, as well as tracks, zones, sectors and blocks. Other types of data storage segments which comprise each logical volume may also be interleaved. More than two logical volumes may also be interleaved on a single physical drive.

The invention also includes a broad variety of approaches to selecting the sequence in which data storage segments from one logical volume are interleaved with data storage segments from another. In one embodiment, requests for cylinders in a first logical volume are mapped to the cylinders in the physical volume having addresses equal to twice the requested address. Requests for cylinders in a second logical volume are mapped to cylinders in the physical drive having addresses equal to twice the requested address, minus the total number of cylinders on the physical drive, plus one.

These and still further objects, benefits and features of the present invention will now become clear upon a review of the following detailed description of the preferred embodiments and drawings.

BRIEF DESCRIPTION OF THE DRAWINGS

FIG. 1 is a block diagram of a computer connected to several drives, including a single physical drive containing two logical volumes.

FIG. 2 is a perspective view of a typical hard disk drive.

FIG. 3 is a top view of a portion of the storage platters shown in FIG. 2, divided into two logical volumes in accordance with a well known prior art technique.

FIG. 4 is a graph illustrating the position of the heads shown in FIG. 2 as a function of time in response to requests to the two logical volumes mapped to the single physical drive shown in FIG. 3.

FIG. 5 is a top view of a portion of the storage platters shown in FIG. 2, divided into two logical volumes in accordance with one embodiment of the present invention.

FIG. 6 is a graph illustrating the position of the heads shown in FIG. as a function of time in response to the same data requests used in connection with FIG. 4.

FIG. 7 is a block diagram illustrating the address converter of the logical volume controller made in accordance with one embodiment of the present invention.

FIG. 8 is a top view of the storage platters shown in FIG. 2, divided into two logical volumes in accordance with another embodiment of the present invention.

FIG. 9 is a top view of a portion of the storage platters shown in FIG. 2, divided into two logical volumes in accordance with another embodiment of the present invention.

DETAILED DESCRIPTION OF THE PREFERRED EMBODIMENTS

FIG. 1 is a block diagram of a computer connected to several drives, including a single drive containing two logical volumes.

As shown FIG. 1, a computer 10 is connected to a plurality of drives 12, 14, 16 and 18. Controllers 20, 22, 24 and 26 serve as interfaces between the computer 10 and the drives 12, 14, 16 and 18, respectively. As is well known in the art, the controller causes the heads in each drive to be positioned over a requested track, as well as accomplishing other tasks. Drives 14, 16 and 18 are single volume physical drives, while drive 12 is a single physical drive containing two logical volumes.

There are, of course, a broad variety of configurations which each of the drives 12, 14, 16 and 18 can take, as is well known in the art. FIG. 2 is a perspective view of one typical configuration. As shown in FIG. 2, the hard drive includes a plurality of platters 30, a plurality of heads 32, and a motor connected to the platters 30 to rotate them, only a spindle of which is shown as 34.

FIG. 3 is a top view of a portion of the storage platters 30 shown in FIG. 2, divided into two logical volumes in accordance with a well-known prior art technique.

As shown in FIG. 3, a first logical volume, designated as "A," occupies a zone on the outer portion of the platters 30 and consists of cylinders numbered 0, 1, 2, 3, 4, 5, etc. A second logical volume designated as "B," resides on the inner portion of the platters and consists of cylinders numbered 99, 98, 97, 96, 95, 94, 93, etc.

FIG. 4 is a graph illustrating the position of the heads 32 shown in FIG. 2 as a function of time in response to typical data requests to the two logical values mapped to a single physical drive as shown in FIG. 3. As shown in FIG. 4, the heads "ping pong" between logical volume A and logical volume B during operation of the computer. This "ping pong" effect is typical because the software in the computer usually expects logical volumes A and B to be separate physical drives. By alternating data accesses between the logical volumes, the software expects to minimize the time which is taken for transferring data. While one drive is moving its heads to a new action, the other drive can be reading or writing data.

But when two logical drives are consolidated onto a single physical drive, the effort of the software to save time by alternating requests between volumes actually turns out to waste time. On the average, the heads on a single physical drive must travel about half of the platter radius between each access.

FIG. 4 illustrates an access pattern in which each data access alternates between each logical volume. Of course, it is to be understood that many systems will not switch between volumes after every single access. Nevertheless, many systems do switch frequently between volumes because of the software's expectation that each volume resides on a separate physical drive and its corresponding belief that frequent switching between volumes will increase the overall effective rate of data transfer. As can be seen in FIG. 4, when the switching is frequent, much time is wasted while the heads are moving back and forth between each requested cylinder. Needless to say, the heads cannot read or write from a particular cylinder until they are positioned over it.

FIG. 5 is a top view of a portion of the storage platters 30 shown in FIG. 2, divided into two logical volumes in accordance with one embodiment of the present invention. As shown in FIG. 5, the cylinders which comprise logical volumes A and B are interleaved. More specifically, the cylinders which comprise logical volume A are mapped to the actual cylinder on the platter having a number equal to twice the requested cylinder. For the cylinders consisting of logical volume B, each requested cylinder is mapped to the physical cylinder on the physical drive having an address equal to twice the requested address, minus the total number of interleaved cylinders on the physical drive, plus one. This results in the following interleaved cylinder sequence: 0, 50, 1, 51, 2, 52, . . . 96, 47, 97, 48, 98, 49 and 99. Although the platters are illustrated in FIG. 5 as containing only a hundred cylinders, it is to be understood that it can (and usually does) contain a much larger number.

FIG. 6 is a graph illustrating the position of the heads 32 shown in FIG. 2 as a function of time in response to the same data requests used in connection with FIG. 4. As can be seen from a comparison of FIG. 6 to FIG. 4, a substantial enhancement in performance has been achieved through the use of the interleaved feature of the present invention. As is evident from an examination of FIG. 6, the reason for this enhancement is because of the interleaved cylinders and the associated shorter distances through which the heads have to traverse when moving back and forth between logical volumes.

FIG. 7 is a block diagram illustrating an address converter 40 portion of the logical volume A/B controller 20 shown in FIG. 1. The address converter 40 maps the data request addresses received from the computer to the actual physical addresses on the physical drive.

In some configurations, the software understands that a single physical drive has been divided into a plurality of logical volumes. In these configurations, however, the software still usually expects each logical volume to be located in a physically separate zone of the physical drive, as shown in FIG. 3, and specifies access addresses accordingly. When the interleaved configuration of the invention is implemented, however, the address converter 40 must map the requested addresses specified by the computer to the actual addresses of the data segments on the physical drive.

When the invention is implemented with interleaved cylinders as shown in FIG. 5 and a system which expects both logical drives to be present on a single physical drive with the arrangement shown in FIG. 3, the address converter implements the following equations:

(1) For the first logical volume:

$$PA=SA*2,$$

where PA is the physical address on the physical drive and SA is the specified address from the computer.

(2) For the second logical volume:

$$PA=2*SA-PC+1,$$

where PA and SA are as defined above, and where PC is the total number of cylinders on the physical drive.

In order to determine which of these formulas to apply to the incoming specified address ("SA"), the address converter must know whether the specified address ("SA") is a member of the first or second logical volume. Such a determination can be made by the address converter by simply comparing the specified address ("SA") with the known ranges of cylinders which the computer perceives as comprising each logical volume.

In other configurations, of course, the computer is unaware of the fact that separate logical volumes are contained on a single physical drive. In these configurations, the address converter will not be able to distinguish between logical volumes based on the cylinder number contained within the specified address. Moreover, the formulas described above will not work.

In such configurations, the specified address usually contains an additional field of information identifying the physical drive on which the data operation is to occur. The address converter utilizes the drive identification information as the basis for determining which of the following two mapping formulas to apply:

(1) For addresses on the first logical volume:

$$PA=SA*2,$$

where PA is the physical address on the physical drive and where SA is the specified address from the computer.

(2) For addresses on the second logical volume:

$$PA = SA*2+1,$$

where PA and SA are as defined above.

Of course, the address converter can also utilize a broad variety of other techniques to effectuate the needed mapping between addresses from the computer and the actual location of the desired data segment on the physical drive. One alternative, for example, is to utilize a mapping table implemented with either hardware, software, firmware, or a combination of these.

FIG. 8 is a top view of the storage platters 30 shown in FIG. 2, divided into two logical volumes in accordance with another embodiment of the present invention. As can be seen in FIG. 8, the data storage segments from each logical volume are interleaved by dividing each logical volume into a set of data storage segments, each consisting of half a cylinder, and by placing the data storage segments of one logical volume on one half of the platters, and the data storage segments of the other logical volume on the other half.

FIG. 9 is a top view of a portion of the storage platters 30 shown in FIG. 2, divided into two logical volumes in accordance with another embodiment of the present invention. This embodiment is very similar to the one shown in FIG. 5. However, the data storage segments which are interleaved no longer consist of single cylinders, but contiguous sets of three cylinders.

The invention is not limited to the specific embodiments which have thus-far been discussed. For example, the data storage segments which are interleaved can consist of cylinders, tracts, sectors or blocks, as well as various combinations or collections or subsets of each. The sequence of interleaving can also vary widely.

Although having been discussed in the context of hard disk drives, moreover, the invention is also applicable to other types of drives, such as optical drives.

The drawings have also thus-far only illustrated application of the invention to systems which have two logical volumes on a single physical drive. However, it is to be understood that the invention is also applicable to systems which have more than two logical volumes on a single physical drive. In such a case, the data storage segments from two or more of such logical volumes would be interleaved in accordance with the techniques and formats discussed above.

Although not yet specifically discussed, it is of course to be understood that the address converter used in the present invention can be implemented in a broad variety of ways, including with software, hardware, firmware, or a combination of these.

The references with have thus-far been made to "data" have also been intended to refer to the concept of "data" in the broadest sense, including not only information supplied by users, but program files, system files, as well as all other types of information which is stored on the drive.

In short, the invention encompasses a broad variety of embodiments and is limited only by the following claims.

I claim:

1. A data storage system including at least one physical drive having a single disk for the storage of computer readable information generated by a computer, comprising:

a disk drive controller coupled between at least one physical drive and the computer for causing the at least one physical drive to be accessible as a plurality of logical volumes by the computer;

said disk drive controller responsive to the computer for the storage and retrieval of the computer readable information from said plurality of logical volumes at specified volume addresses, wherein said plurality of logical volumes include at least two logical volumes, each volume having a controller assigned physical zone on the single disk containing a plurality of data storage segments for storing the computer readable information, each data storage segment being identified by a specific physical disk address;

said disk drive controller including an address converter for converting each specified volume address of a data storage segment to a specific physical disk address to access the requested computer readable information on the single disk; and said disk drive controller further including first volume mapping means for assigning at least some of the data storage segments in one of the physical zones with at least some of the data storage segments in the other one of the physical zones;

said disk drive controller further including second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said controller;

wherein said address converter causes the specified address of each data storage segment in the:

first logical volume to be mapped to the physical address on the disk equal to the specified address times two; and in the second logical volume to be mapped to the physical address on the disk equal to twice the specified address, minus the total number of interleaved cylinders on the physical drive, plus one.

2. A data storage system including at least one physical drive having a single disk for the storage of computer readable information generated by a computer, comprising:

a disk drive controller coupled between at least one physical drive and the computer for causing the at least one physical drive to be accessible as a plurality of logical volumes by the computer;

said disk drive controller responsive to the computer for the storage and retrieval of the computer readable information from said plurality of logical volumes at specified volume addresses, wherein said plurality of logical volumes include at least two logical volumes, each volume having a controller assigned physical zone on the single disk containing a plurality of data storage segments for storing the computer readable information, each data storage segment being identified by a specific physical disk address;

said disk drive controller including an address converter for converting each specified volume address of a data storage segment to a specific physical disk address to access the requested computer readable information on the single disk; and said disk drive controller further including first volume mapping means for assigning at least some of the data storage segments in one of the physical zones with at least some of the data storage segments in the other one of the physical zones;

said disk drive controller further including second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said controller;

wherein said address converter causes the specified address of each data storage segment in the:

first logical volume to be mapped to the physical address on the disk equal to the specified address times two; and in the second logical volume to be mapped to the physical address on the disk equal to twice the specified address, plus one.

3. A data storage system including at least one physical drive having a single disk for the storage of computer readable information generated by a computer, comprising:

a disk drive controller coupled between at least one physical drive and the computer for causing the at least one physical drive to be accessible as a plurality of logical volumes by the computer;

said disk drive controller responsive to the computer for the storage and retrieval of the computer readable information from said plurality of logical volumes at specified volume addresses, wherein said plurality of logical volumes include at least two logical volumes, each volume having a controller assigned physical zone on the single disk containing a plurality of data storage segments for storing the computer readable information, each data storage segment being identified by a specific physical disk address;

said disk drive controller including an address converter for converting each specified volume address of a data storage segment to a specific physical disk address to access the requested computer readable information on the single disk; and said disk drive controller further including first volume mapping means for assigning at least some of the data storage segments in one of the physical zones with at least some of the data storage segments in the other one of the physical zones;

said disk drive controller further including second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said controller;

wherein each interleaved data storage segment is a zone on the disk.

4. A data storage system including at least one physical drive having a single disk for the storage of computer readable information generated by a computer, comprising:

a disk drive controller coupled between at least one physical drive and the computer for causing the at least one physical drive to be accessible as a plurality of logical volumes by the computer;

said disk drive controller responsive to the computer for the storage and retrieval of the computer readable information from said plurality of logical volumes at specified volume addresses, wherein said plurality of logical volumes include at least two logical volumes, each volume having a controller assigned physical zone on the single disk containing a plurality of data storage segments for storing the computer readable information, each data storage segment being identified by a specific physical disk address;

said disk drive controller including an address converter for converting each specified volume address of a data storage segment to a specific physical disk address to access the requested computer readable information on the single disk; and said disk drive controller further including first volume mapping means for assigning at least some of the data storage segments in one of the physical zones with at least some of the data storage segments in the other one of the physical zones;

said disk drive controller further including second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said controller;

wherein each interleaved data storage segment is a sector on the disk.

5. In combination with a data storage system, a physical drive having a single disk for the storage of computer readable information generated by a computer, said physical drive divided into at least two logical volumes, each volume containing a plurality of data storage segments, at least some of the data storage segments in one volume being physically interleaved with at least some of the data storage segments in the other volume, a disk drive controller, comprising:

an address converter for converting each volume address of a data storage segment to a specific physical disk address to access computer readable information on the single disk;

first volume mapping means for assigning at least some of the data storage segments in one of the physical zones with at least some of the data storage segments in the other one of the physical zones; and second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said first volume mapping means and said second volume mapping means;

wherein each interleaved data storage segment is a zone on the disk.

6. In combination with a data storage system, a physical drive having a single disk for the storage of computer readable information generated by a computer, said physical drive divided into at least two logical volumes, each volume containing a plurality of data storage segments, at least some of the data storage segments in one volume being physically interleaved with at least some of the data storage segments in the other volume, a disk drive controller, comprising:

an address converter for converting each volume address of a data storage segment to a specific physical disk address to access computer readable information on the single disk;

first volume mapping means for assigning at least some of the data storage segments in one of the physical zones with at least some of the data storage segments in the other one of the physical zones; and second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said first volume mapping means and said second volume mapping means;

wherein each interleaved data storage segment is a sector on the disk.

7. A computer system containing a physical drive having a single disk divided into at least two logical volumes, each volume containing a plurality of data storage segments, comprising:

a computer for specifying physical addresses of data storage segments on at least two logical volumes, each data storage segment having an address on the disk;

a disk drive controller including:

an address converter for converting each specified volume address of a data storage segment to a specific physical disk address;

first volume mapping means for assigning at least some of the data storage segments in one of the physical zones with at least some of the data storage segments in the other one of the physical zones; and second volume mapping means for assigning at least some of the data storage segments in the other one of the physical zones with at least some of the data storage segments in the one of the physical zones to effect data storage segment interleaving so that alternating volume access requests generated by the computer do not cause substantial time delays due to the retrieval of the computer readable information from the physical zones assigned by said controller;

wherein the interleaving of data storage segments increases the average rate of data transfer by a substantial period of time relative to the non-interleaving of data storage segments.

\* \* \* \* \*